United States Patent [19]

Rife

[11] Patent Number: 5,383,727
[45] Date of Patent: Jan. 24, 1995

[54] POUCH READILY ADAPTABLE FOR ATTACHMENT TO MOUNTING SURFACE

[76] Inventor: Guerin D. Rife, 1230 Via Salerno, Winter Park, Fla. 32789

[21] Appl. No.: 67,027

[22] Filed: May 26, 1993

[51] Int. Cl.⁶ ..................... B65D 33/14; B65D 33/24
[52] U.S. Cl. ..................................... 383/11; 150/900; 224/275; 383/43
[58] Field of Search .................. 383/11, 43; 224/901, 224/42.45 R, 275, 227; 150/113, 900; 190/110

[56] References Cited

U.S. PATENT DOCUMENTS

| | | | |
|---|---|---|---|
| 1,214,282 | 1/1917 | Day | 224/42.46 R |
| 2,210,755 | 8/1940 | Frank | 150/113 |
| 2,223,532 | 12/1940 | Sallop | 224/275 |
| 2,453,940 | 11/1948 | Slobotkin | 383/43 |
| 2,582,447 | 1/1952 | Meyers | 150/113 |
| 2,894,675 | 7/1959 | Stein | 383/11 |
| 3,151,649 | 10/1964 | Mitchell, Jr. | 224/42.46 R |
| 3,426,958 | 2/1969 | Gore | 383/11 |
| 3,589,595 | 6/1971 | White | 383/11 |
| 3,632,029 | 1/1972 | Sonner | 224/275 |
| 4,079,767 | 3/1978 | Howard | 224/901 |
| 4,131,313 | 12/1978 | Jacobs . | |
| 4,134,616 | 1/1979 | Christensen . | |
| 4,260,004 | 4/1981 | Domke | 190/110 |
| 4,386,642 | 6/1983 | Durbin | 190/110 |
| 4,387,924 | 6/1983 | Fernández . | |
| 4,463,789 | 8/1984 | Leiserson | 190/110 |
| 4,747,639 | 5/1988 | Pfau . | |
| 4,813,751 | 3/1989 | Fenn . | |
| 4,854,637 | 8/1989 | McCree . | |
| 4,974,620 | 12/1990 | Quillan et al. . | |
| 5,112,104 | 5/1992 | De Giacomi . | |
| 5,120,108 | 6/1992 | Watson et al. . | |

Primary Examiner—Stephen P. Garbe
Attorney, Agent, or Firm—Julian C. Renfro

[57] ABSTRACT

A pouch readily adaptable for attachment to a mounting surface, this pouch affording a user a readily accessible storage location for relatively small items. This pouch is comparatively flat, having front and back portions, with the front and back portions each having an upper edge. The pouch is elongate in a width sense, having a pair of side edges as well as a bottom edge, with the side edges as well as the bottom edge of the pouch being closed. A top opening is defined between the upper edge of the front portion and the upper edge of the back portion, and an external portion of the upper edge of the back portion serves as a mounting location for the pouch. Readily separable mounting components are utilized, so that the pouch can be easily removed from the mounting surface. The front edge of the pouch is made of elasticized material, thus enabling the user to readily move the front edge away from the back edge for the insertion of an item into the pouch, or to permit the retrieval of an item from the pouch.

19 Claims, 1 Drawing Sheet

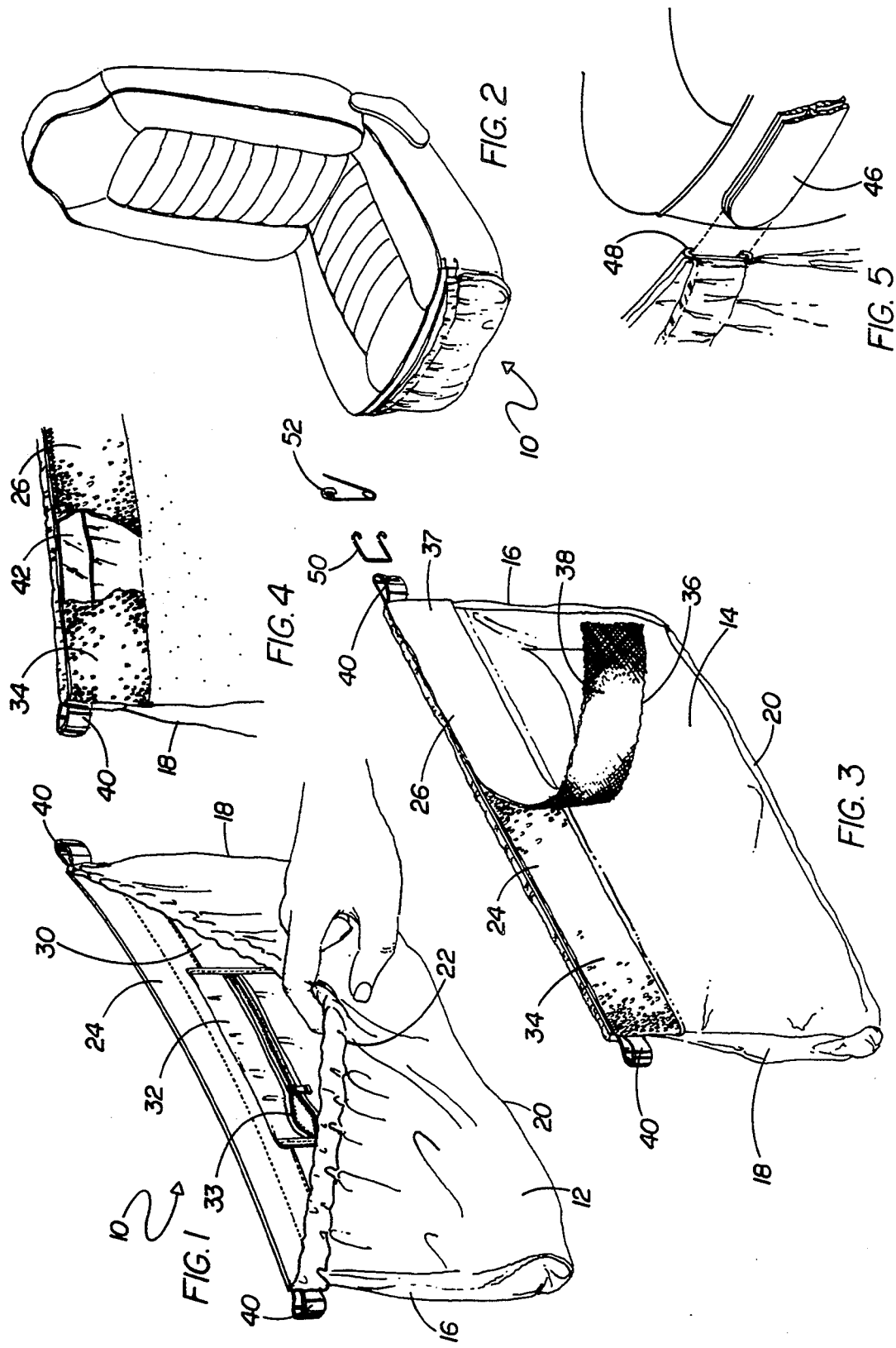

POUCH READILY ADAPTABLE FOR ATTACHMENT TO MOUNTING SURFACE

BACKGROUND OF THE INVENTION

It is well known that a wide variety of pouches have been provided for use by shoppers, travelers, businessmen and the like, but typically these prior art pouches have been provided with handles or other means whereby they can be carried relatively easily.

One form of pouch generally relevant to this invention involves the McCree U.S. Pat. No. 4,854,637 entitled "Seat Cushion Back Pack," which is a multi-mode pouch adapted for use when going to and from sporting events. The McCree pouch is formed with flaps having a plurality of pockets, with the pocket openings available to the user being oriented upwardly when his pouch is either in the back pack mode or in the mode in which it is used as a seat cushion.

Somewhat relatable to the McCree pouch is the Watson et al U.S. Pat. No. 5,120,108 entitled "Convertible Seat Cushion/Tote Bag for Skates," which is a combination device made up of a plurality of panels hinged together. In one mode, the second storage panel of the Watson et al device is designed to hang down in front of the bench in a dressing room, so that the pockets provided therein can hold small equipment in an organized manner.

As will become more apparent hereinafter, pouches along the lines of that taught in patents of this general type fall far short of providing the highly advantageous features of the present invention.

SUMMARY OF THE INVENTION

In accordance with this invention, I provide a portable pouch equipped with means enabling it to be readily attachable to a mounting surface. Although I am not to be limited to such, a mounting surface of particular interest is represented by the front edge of an automobile seat, for the use of a pouch in accordance with the present invention in such a location affords the user a readily accessible storage location for relatively small items. The present novel pouch is comparatively wide and flat, and has front and back portions, with these front and back portions each having an upper edge. The pouch has a pair of side edges as well as a bottom edge, with the side edges as well as the bottom edge of the pouch being closed, such as by stitching.

Importantly, a top opening is defined between the upper edge of the front portion and the upper edge of the back portion. It is also to be noted that the pouch is elongate in a width sense, such that an elongate item such as a flashlight may be placed in the pouch, or a number of small items inserted, such as sunglasses, windshield scraper, maps, seldom used keys and the like. The construction of my pouch is such as to permit its sidewalls to readily move so as to conform to the item or items inserted therein.

An external part of the upper rear portion of the pouch serves as a mounting means for the pouch, whereas the front edge of the pouch is made of elasticized material. Because of this construction, the user can readily move the front edge away from the back edge in order to insert an item into the pouch, or to permit the retrieval of an item from the pouch.

It is a primary object of this invention to provide a pouch of effective yet inexpensive construction, that for the convenience of a user can be readily and reliably installed in any of a number of different locations, such as in automobiles, motorhomes, boats and the like.

It is another object of my invention to provide a pouch of flexible construction that is configured to be readily attached to a convenient location, with the top of the pouch able to be pulled apart by the user to permit the insertion of an object into the pouch, or to enable the retrieval of an object from the pouch.

It is still another object of my invention to provide a pouch or versatile construction whose upper rear edge is provided with material enabling the pouch to be readily installed to a location such as the front part of the seat of an automobile, with such pouch affording a motorist a highly convenient location in which to place miscellaneous items.

It is yet still another object of my invention to provide a pouch utilizing a pair of upper edges, with the upper front edge being of elasticized material, and the upper rear edge containing a relatively rigid member that the user can easily bend by his hands, so that the pouch can rather closely conform to the specific mounting surface upon which the pouch is to be mounted.

It is yet still another object to provide a conveniently configured pouch designed to be secured at a desired location on a mounting surface by the use of separable mounting means, such separable mounting means making it readily possible for the user to remove the pouch from the mounting surface when this becomes desirable.

It is yet still another object to provide a conveniently configured pouch designed to receive an item to be temporarily stored, which pouch is secured at a desired location on a mounting surface by the use of readily detachable means, with these means making it possible for the pouch to be readily detachable from the mounting surface, when the temporarily stored item is to be moved to another location.

These and other objects, features and advantages will be apparent from a study of the appended drawings.

BRIEF DESCRIPTION OF DRAWINGS

FIG. 1 is a perspective view of a preferred embodiment of a pouch in accordance with this invention, showing how the elasticized front edge of the pouch can be pulled away from the back edge to permit the insertion or retrieval of an object, with this view also revealing that an inner pocket may be attached to the upper rear inside surface of the pouch:

FIG. 2 is a view of one specific utilization for my novel pouch, where it is seen to be attached to the front portion of a seat for an automobile, boat or the like, with the pouch residing behind the knees of a person sitting in the seat;

FIG. 3 is a perspective view of the rear side of a pouch in accordance with this invention, revealing the use of one type of "VELCRO" on the upper rear portion of the pouch, to serve as a removable type of mounting means, with this view also revealing a strip of the opposite type of "VELCRO" that is to be affixed to the mounting surface;

FIG. 4 is a fragmentary view taken from the upper rear portion of the pouch, with a portion of the pouch broken away to reveal a relatively rigid member utilized in the upper rear portion of the pouch, which member can be readily shaped by the user so as to cause the rear edge of the pouch to conform rather closely to the particular surface upon which the pouch is to be mounted; and FIG. 5 is a fragmentary view showing an alternative form of a removable pouch mounting arrangement, wherein a track is provided on a front portion of the automobile or boat seat to serve as a mounting means, along which track, the rear edge of the pouch may be slid at the time it is to be attached to the seat.

DETAILED DESCRIPTION

With initial reference to FIG. 1, it will be seen that I have shown a portable pouch 10 that is readily attachable to a mounting surface, in that way to afford a user a readily accessible storage location for relatively small items. The pouch 10 is comparatively flat, having a front portion 12 and a back portion 14. Significantly, the front portion 12 has an upper edge 22, and the back portion 14 has an upper edge 24. The pouch 10 has side edges 16 and 18, and a bottom edge 20, with the side edges of the pouch being closed, such as by stitches. The bottom 20 can either be a continuous member extending from front to back, or, alternatively, bottom stitches may be utilized to effect closure.

A top opening 30 is defined between the upper interior edge 22 of the front portion and the upper interior edge 24 of the back portion. The pouch 10 is elongate in a width sense, so as to define a storage location for numerous relatively small items, or one or two items of elongate configuration, such as a flashlight, a compacted umbrella or the like. My novel pouch may be made from material impervious to moisture, thus making it possible for my pouch also to be ideal for temporarily receiving one or more wet bathing suits, with such use obviously serving to prevent the bathing suits from wetting any interior portion of an automobile, for instance. On the other hand, a pouch in accordance with my invention could be constructed to have webbed portions, so that the contents of the pouch can "breathe."

Significantly, the upper edge 22 of the front portion is of elasticized material, thus explaining its "gathered" (shirred) appearance in FIG. 1, whereas the external part of the upper back portion 24 represents the location of the mounting means 26 for the pouch. Because of the use of the elasticized material in the front edge 22, the user can readily move the upper front edge away from the back edge 24 in the manner depicted in FIG. 1, to permit the insertion of an item into the pouch, or to permit the retrieval of an item from the interior of the pouch. As will be seen in greater detail hereinafter, by utilizing mounting means having separable components, the user can readily separate these components at such time as the user wishes to remove the pouch, such as for cleaning.

In the instance in which my pouch is utilized for the temporary storage of wet bathing suits, for example, the pouch could be removed from the seat, and utilized for transporting the wet bathing suits to the location where they are to be hung up to dry.

The pulling away of the upper front edge 22 from the back edge 24 in the manner shown in FIG. 1 reveals the possible use of an inner pocket 32, which may for example be provided with a zipper 33 to effect closure of the inner pocket. The rear side of the inner pocket 32 would typically be sewn or glued to the upper interior portion of the back portion 14 of the pouch 10.

Although I am not to be limited to any particular mounting or securing means, "VELCRO" material may be utilized along the outer or external portion of the upper rear edge 24, to serve as a desired form of mounting means or attaching means 26, as will be discussed in conjunction with FIG. 3. As is obvious, the use of "VELCRO" represents a readily separable mounting means or attaching means, for this construction simplifies the removal of the pouch from the mounting surface. Alternative versions of a separable mounting means will be hereinafter described.

As later discussed, I may prefer to utilize additional attaching means adjacent both locations where a side edge intersects the back portion, to prevent undesired separation of the back portion from the mounting surface. Such additional attaching means may involve a loop, such as a small elasticized loop 40 at the upper part of each side edge of the pouch. Such loops would be sewn in place or otherwise tightly affixed to the upper corners of the pouch.

With reference to FIG. 2, it will be seen that my pouch 10 can be readily affixed to the front portion of an automobile seat, affording the motorist a very convenient and readily accessible location for small items likely to be needed during either a drive around town, or on an extended automobile trip. As is obvious, my novel pouch could also be used on the front or side of a truck seat, on the interior side of a door, on or near a boat seat, or the like. In the example shown in FIG. 2, it will be apparent from FIG. 2 that the pouch will reside behind the knees of the person occupying the seat. Because of the construction involving the preferred use of easily separated mounting means, the pouch 10 can be readily removed from its mounting, if and when such is desired.

FIG. 3 is a perspective view of the rear side of a pouch in accordance with this invention, revealing the use of a preferred form of separable mounting means 26 for enabling the pouch to be readily attached to the front edge of the seat or other mounting surface. In this preferred embodiment, hook type "VELCRO" 34, typically of a width of one to two inches, is affixed to the exterior or rear side of the upper edge 24, extending the entire width of the pouch, from one side edge of the pouch to the other. Utilized in conjunction with the hook type "VELCRO" 34 is the separate mounting strip 36, upon which loop type "VELCRO" 38 is utilized. Because of such utilization of "VELCRO," the entire pouch 10 can be readily removed from its mounting surface, so that its contents can be poured out; so that the pouch can be cleaned; or to enable it to be used as a temporary purse for items such as swimwear, when going to a lake, ocean or park. My pouch can also serve as a trash receptacle.

It is to be understood that in accordance with the embodiment of this invention depicted in FIG. 3, I utilize on the side of the mounting strip 36 opposite the loop type "VELCRO" 38, an adhesive, cement or glue, enabling the mounting strip 36 to be easily attached to the mounting surface which, in the typical instance, is the front portion of an automobile or boat seat. Preferably I utilize pressure sensitive adhesive on the mounting strip 36 opposite the loop type "VELCRO" 38, upon which is placed a protective strip 37, such as of waxed paper. The protective strip 37 serves to prevent the pressure-sensitive adhesive from accidently and prematurely attaching to a foreign object or surface.

It is to be noted that I am not limited to an arrangement in which hook type "VELCRO" 34 is used along the upper rear edge of the pouch, for hook type "VELCRO" could instead be used on the mounting strip 36, and loop type "VELCRO" used on the upper rear edge of the pouch. However, it should be quite clear that in most instances, it is highly advantageous to utilize hook type "VELCRO" 34 along the exterior of the rear surface of the pouch 10, for this arrangement makes it possible in some instances for the hook type "VELCRO" on the upper rear edge of the pouch 10 to be readily and directly attached to the automobile seat, this being particularly true when the seat presents a fabric edge. In such an instance, the use of the mounting strip 36 becomes unnecessary, but it then becomes desirable for supplemental attaching means to be used for securing the edges of the pouch to such a seat.

As will be noted from the upper right hand corner of the pouch as revealed in FIG. 3, I may utilize a U-shaped hook 50 in connection with each of the aforementioned elasticized loops 40 that are secured at the upper corners of the pouch. As is obvious, what may be regarded as the bottom of each U-shaped hook would be sized to conform to the width of the loops 40, with the upper end of each arm of the U-shaped hook having a bent over portion. Such bent over portions are preferably provided with sharp points, so that these bent over portions or hooks may readily engage the fabric of a fabric seat upon which the pouch is to be secured.

As will be obvious to those skilled in this art, a rather severe force is transmitted to the upper corners of the pouch at such time as the upper front edge 22 is pulled away from the upper back portion 24 in the manner depicted in FIG. 1. As a result of this force, the hook type "VELCRO" 34 engaging a fabric seat might well be caused to separate from the seat, with this leading to an undesirable detachment of the pouch from the fabric seat. This undesirable result is effectively prevented by the user taking the time to attach U-shaped hooks to opposite front edges of the seat, with this being accomplished at such time as the elasticized loops 40 have been stretched to a considerable extent.

In other words, after a first U-shaped hook 50 has been inserted through the adjacent loop 40, the hook 50 is attached to the fabric at a suitable location on the front or side of the seat. This is immediately followed by the user inserting a second U-shaped hook 50 through the loop at the opposite end of the pouch, subsequent to which the user causes a stretching of both loops so that at such time as the second hook 50 is attached to the fabric of the seat in the manner shown in FIG. 2, both loops 40 remain in a stretched condition. I have found that a procedure of this type is highly effective in preventing any undesirable pulling away of the pouch from the front of a fabric seat, as a result of the holding force of the "VELCRO" along the rear edge 24 of the pouch being overcome by the user's efforts to insert or remove an item from the pouch. Supplemented by the use of the hooks and loops, the hook type "VELCRO" utilized on the upper exterior edge of the back of the pouch will serve quite well to hold the pouch firmly to a fabric seat.

Although I prefer the utilization of U-shaped hook members 50 in conjunction with the elasticized loops 40, I may instead use safety pins 52 with the loops instead of the members 50, should the use of safety pins for some reason or another become desirable.

Continuing with the use of "VELCRO" as a securing means for my pouch, it is to be noted that another reason for preferably using loop type "VELCRO" 38 on the mounting strip 36 is that when the strip 36 has been attached by pressure-sensitive glue or otherwise to the front of a non-fabric seat, this type of "VELCRO" does not tend to snag the clothing of the motorist or boater. As should be apparent, hook type Velcro utilized on the seat of the automobile or boat might well tend to affix itself to clothing, when, for example, the motorist or boater is wearing loose-weave clothing, such as woolen trousers, a woolen skirt, or stockings.

As revealed from the broken-away portion of FIG. 4, I prefer to utilize a semi-rigid member 42 along the interior of the rear edge of my pouch, which member the user can readily conform by the use of his or her hands to the configuration of the particular mounting surface. For example, if the pouch is to be mounted on the front edge of a curved automobile or boat seat, the user can be assured that the rear edge of the pouch can closely conform to such a mounting surface by appropriate configuring of the member 42. As one example, the semi-rigid member 42 can be a relatively soft aluminum strip.

With reference to FIG. 5, I there reveal an alternative embodiment of a readily separable mounting means for a pouch in accordance with this invention. In this embodiment, a relatively stiff member 46 is mounted semi-permanently on the front edge of the mounting surface, such as a seat, which member is utilized as a type of track member. The track member 46 preferably has a rounded edge, as revealed in FIG. 5, and is available to receive one or more C-shaped members 48 mounted along the rear edge of the pouch. The C-shaped member or members 48, also known as track-engaging members, are intended to be slid along the length of the relatively rigid track member 46, so as to accomplish the mounting of the pouch on the front of the seat. The pouch can also be readily removed from the track member 46 by moving the pouch laterally along the seat.

As should be obvious, when the embodiment of FIG. 5 is utilized, the relatively rigid track member 46 should be of consistent cross section, so that the C-shaped members 48 can slide easily along the member 46 without binding. As is also obvious, several relatively small C-shaped members 48 can be affixed along the upper rear edge of the pouch, or as an alternative, the track-engaging member can take the form of a single member of C-shaped cross section, that is affixed to the upper rear edge of the pouch, and extending across the width thereof.

In some instances when utilizing the embodiment of FIG. 5, it may be desirable to eliminate the semi-rigid member 42 as such, and to rely upon the single elongate C-shaped member secured along the upper rear edge of the pouch, for providing the desired stiffness to the upper part of the pouch. In this instance, the user would bend the elongate C-shaped member such that it conforms closely with the possible curvature of the track 46 utilized on the mounting surface.

Although my pouch is typically intended for utilization in a form readily removable from a mounting surface, it is obvious that a user could glue or otherwise permanently secure the rear side of the pouch to a mounting surface, in instances in which it is not desirable for the pouch to be removable.

As should now be apparent, I have provided a novel and highly effective pouch that is exceedingly easy to use, that can be readily attached to a wide variety of mounting surfaces, that can be manufactured at a relatively low cost, and that will give many years of service. The fact that my pouch is principally intended for use around or upon a vehicle seat does not prevent it also being usable upon a number of other surfaces.

I claim:

1. A pouch readily attachable to a mounting surface, for affording a user a readily accessible storage location for relatively small items, said pouch being comparatively flat and having front and back portions, with said front and back portions each having an upper edge, said pouch being elongate in a width sense and having a pair of side edges as well as a bottom edge, said side edges as well as said bottom edge of said pouch being closed, a top opening defined between said upper edge of said front portion and said upper edge of said back portion, an external portion of said back portion having attaching means thereon for enabling said pouch to be attached to a mounting surface, additional attaching means disposed adjacent both locations where a side edge intersects said back portions, to prevent undesired separation of said back portion from the mounting surface, said front edge being made of elasticized material, whereby the user can readily move said front edge away from said back edge for the insertion of an item into the pouch, or to permit the retrieval of an item from the pouch.

2. The pouch as recited in claim 1 in which said attaching means is constituted by separable components, whereby said pouch is readily removable from the mounting surface.

3. The pouch as recited in claim 2 in which said attaching means involves the use of hook and loop fastening means.

4. The pouch as recited in claim 1 in which an inner pocket is mounted in the interior of said pouch.

5. The portable pouch as recited in claim 1 in which said additional attaching means is a loop provided at the upper portion of each side edge, and securing means for attaching each loop to the mounting surface.

6. The portable pouch as recited in claim 5 in which each of said loops is an elasticized loop, and said securing means for attaching each elasticized loop to the mounting surface is a hook.

7. A portable pouch readily attachable to a mounting surface, for affording a user a readily accessible storage location for relatively small items, said pouch being comparatively flat, and having front and back portions, with said front and back portions each having an upper edge, said pouch being elongate in a width sense and having a pair of side edges as well as a bottom edge, said sides edges as well as said bottom edge of said pouch being closed, a top opening defined between said upper edge of said front portion and said upper edge of said back portion, an external portion of said upper edge of said back portion serving as a mounting means for said pouch, an additional mounting means disposed adjacent both locations where a side edge intersects said back portion, to prevent possible separation of said back portion from the mounting surface, said front edge being made of elasticized material, whereby the user can readily move said front edge away from said back edge for the insertion of an item into the pouch, or to permit the retrieval of an item from the pouch.

8. The portable pouch as recited in claim 7 in which said mounting means is constituted by separable components, whereby said pouch is readily removable from the mounting surface.

9. The portable pouch as recited in claim 8 in which hook and loop fastening means is used as said mounting means.

10. The portable pouch as recited in claim 9 in which hook type fastening means is utilized along the upper back edge of the pouch.

11. The portable pouch as recited in claim 7 in which an inner pocket is mounted in the interior of said pouch.

12. The portable pouch as recited in claim 7 in which said additional mounting means is a loop provided at the upper portion of each side edge, and securing means for attaching each loop to the mounting surface.

13. The portable pouch as recited in claim 12 in which each of said loops is an elasticized loop, and said securing means for attaching each elasticized loop to the mounting surface is a hook.

14. A portable pouch readily attachable to a mounting surface, for affording a user a readily accessible storage location for relatively small items, said pouch being comparatively flat, and having front and back portions, with said front and back portions each having an upper edge, said pouch having a pair of side edges as well as a bottom edge, said pouch being elongate in a width sense, with said sides edges as well as said bottom edge of said pouch being closed, a top opening defined between said upper edge of said front portion and said upper edge of said back portion, mounting means for said pouch defined along an external portion of said upper edge of said back portion, said mounting means being constituted by separable portions, such that said pouch can be readily removed from the mounting surface, additional mounting means disposed adjacent both locations where a side edge intersects said back portion, to prevent an undesired, premature separation of said back portion from the mounting surface, said front edge of said pouch being made of elasticized material, whereby the user can readily move said front edge away from said back edge for the insertion of an item into the pouch, or to permit the retrieval of an item from the pouch.

15. The portable pouch as recited in claim 14 in which hook and loop fastening means is used as said mounting means.

16. The portable pouch as recited in claim 15 in which hook type fastening means is utilized along the upper back edge of the pouch.

17. The portable pouch as recited in claim 14 in which an inner pocket is mounted in the interior of said pouch.

18. The portable pouch as recited in claim 14 in which said additional mounting means is a loop provided at the upper portion of each side edge, and securing means for attaching each elasticized loop to the mounting surface.

19. The portable pouch as recited in claim 18 in which each of said loops is an elasticized loop, and said securing means for attaching each elasticized loop to the mounting surface is a hook.

* * * * *